United States Patent
Zou et al.

(10) Patent No.: US 8,509,781 B2
(45) Date of Patent: Aug. 13, 2013

(54) METHOD AND SYSTEM FOR REALIZING SESSION HANDOVER

(75) Inventors: Changle Zou, Shenzhen (CN); Zhendong Li, Shenzhen (CN); Zhenwu Hao, Shenzhen (CN); Congjie Mao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 13/509,152

(22) PCT Filed: Nov. 10, 2010

(86) PCT No.: PCT/CN2010/078607
§ 371 (c)(1),
(2), (4) Date: May 10, 2012

(87) PCT Pub. No.: WO2011/057568
PCT Pub. Date: May 19, 2011

(65) Prior Publication Data
US 2012/0220300 A1    Aug. 30, 2012

(30) Foreign Application Priority Data
Nov. 11, 2009    (CN) .......................... 2009 1 0178354

(51) Int. Cl.
*H04W 36/00* (2009.01)
(52) U.S. Cl.
USPC ........ 455/436; 455/456.1; 455/522; 370/331; 370/328; 370/352
(58) Field of Classification Search
USPC .................. 455/574, 444, 436, 63.11, 63.17, 455/456.1, 522; 370/328, 331, 389, 266, 370/352; 709/227, 223, 228; 713/158, 320; 714/E11.008
See application file for complete search history.

(56) References Cited

U.S. PATENT DOCUMENTS

| | | | |
|---|---|---|---|
| 2009/0073936 A1* | 3/2009 | Jentz et al. | 370/331 |
| 2009/0080382 A1* | 3/2009 | Chen et al. | 370/331 |
| 2009/0098884 A1* | 4/2009 | Casati et al. | 455/456.1 |
| 2009/0147754 A1* | 6/2009 | Long et al. | 370/331 |
| 2009/0170441 A1* | 7/2009 | Eckert et al. | 455/67.11 |
| 2012/0014356 A1* | 1/2012 | Mutikainen et al. | 370/331 |

FOREIGN PATENT DOCUMENTS

| | | |
|---|---|---|
| CN | 101227647 A | 7/2008 |
| CN | 101242665 A | 8/2008 |
| WO | 2008157461 A1 | 12/2008 |
| WO | 2009035911 A2 | 3/2009 |

OTHER PUBLICATIONS

International Search Report for PCT/cn2010/078607, English Translation attached to original, Both Completed by the Chinese Patent Office on Jan. 20, 2011, 6 Pages.

* cited by examiner

*Primary Examiner* — Mahendra Patel
(74) *Attorney, Agent, or Firm* — Brooks Kushman P.C.

(57) ABSTRACT

A method is provided for realizing session transfer, comprising: a service continuity application server (SCC AS), after receiving a session transfer request, when judging that a state of a session needed to be transferred is in a held state, updating a remote leg by using a held state session state information, and notifying an enhanced mobile switching center (eMSC) that the state of the session needed to be transferred is the held state; and the eMSC completing a call setup of a target access network according to the held state. A system is also provided for realizing session transfer. The method and system can realize correct transfer of a held state voice session, realize correct service logic and improve user experience.

4 Claims, 3 Drawing Sheets

METHOD AND SYSTEM FOR REALIZING SESSION HANDOVER

CROSS-REFERENCE TO RELATED APPLICATION

This application is the U.S. national phase of PC Appln. No. PCT/CN2010/078607 filed Nov. 10, 2010 which claims priority to Chinese Application No. 200910178354.4 filed Nov. 11, 2009, the disclosures of which are incorporated in their entirety by reference herein.

TECHNICAL FIELD

The present invention relates to the communication field, and particularly, to a method and system for realizing voice session transfer in a held state.

BACKGROUND OF THE RELATED ART

In the 2nd Generation (abbreviated as 2G) and 3rd Generation (abbreviated as 3G) mobile communication networks, such as Global System for Mobile communications (abbreviated as GSM) and Universal Mobile Telecommunications System (abbreviated as UMTS), a voice service is provided in circuit switch (abbreviated as CS) domain, and forms a good coverage. With the development of wireless broadband technology and the development of Internet Protocol (abbreviated as IP) technology, the entire network is evolved towards the direction of all-IP. On one hand, the core network of the communication network is evolved towards the IP multimedia core network subsystem (abbreviated as IMS), and on the other hand, the wireless access network is developed towards packet switch; the voice and other services are carried by the packet switch (abbreviated as PS) network, the IMS can be directly accessed, and the IMS provides communication services including the voice service.

The IMS is an IP-based network architecture proposed by the 3rd Generation Partnership Project (abbreviated as 3GPP), which constructs an open and flexible service environment independent of access types, can support multimedia applications, and can provide rich multimedia services to the user.

In the IMS service system, the control layer and service layer are separated, in which the control layer does not provide specific services but only provides necessary functions such as triggering, routing, and charging to the service layer. The service trigger and control function in the control layer is completed by a Call Session Control Function (abbreviated as CSCF). The CSCF is divided into a Proxy (abbreviated as P-CSCF), an Interrogating (abbreviated as I-CSCF), and a Serving (abbreviated as S-CSCF), wherein the Serving is mainly responsible and the Interrogating is optional. The service layer is composed of a series of application servers (abbreviated as AS) for providing particular traffic services. The AS can be an independent entity and can also co-locate with the S-CSCF. The control layer S-CSCF, according to the subscription information of the user, controls service triggering, invokes the services on the AS, and achieves the service functions. The AS and S-CSCF can be collectively referred to as server equipments (SE). The end-to-end equipment in the session is referred to as user equipment (abbreviated as UE) which is responsible for interacting with the user. Some UEs have a plurality of methods to access the network, including accessing the network through the packet switch (abbreviated as PS domain) of 3GPP, accessing the network through the data domain of other non-3GPP, and even accessing the network through the circuit switch (abbreviated as CS) domain, and so on.

For a UE which has a plurality of access methods, whether it can use a plurality of access methods at the same time or can only use one access method at a certain moment, assuming that it is executing a certain service, such as a call service, under an access method, when the UE moves to other place and has to change the used access method, and if the UE and the network can provide a certain method to enable the service being executed by the UE not to be interrupted, such ability is referred to as service continuity, and the application server achieving the service continuity is referred to as a service continuity application server (abbreviated as SCC AS).

FIG. 1 is a service scenario of a voice call transfer (also referred to as voice continuity) under the above scenario. When the user carries out a voice service in a source wireless access coverage area, the user directly accesses the IMS and establishes an IMS voice session with the remote user. When the user moves out of the above coverage area, in order to ensure the continuity of the voice service, the user transfers to the CS network, and the continuity of the call with the remote user is kept by using the session anchoring function in the IMS, so that the good coverage advantage of the CS network can be made the best and the service continuity is ensured. An eMSC (enhanced Mobile Switching Centre) includes functions of a media gateway (divided into a control part MGCF and a media processing part MGW) of the IMS network, which are described by being combined into one entity. In order to simplify illustration and description, the S-CSCF and SCC AS are views as one entity, and they communicate with each other by using a standard Session Initiation Protocol (abbreviated as SIP).

As shown in FIG. 1, before the service continuity procedure occurs, a session is established between the UE-1 and the UE-2, and its signaling paths are described as follows:

A101: is a signaling path between the UE-1 and the P-CSCF which communicate with each other through the SIP protocol of the IMS, and for the SCC AS, it belongs to an access leg path;

A102: is a signaling path between the P-CSCF and the SCC AS/S-CSCF which communicate with each other through the SIP protocol of the IMS, and for the SCC AS, it also belongs to an access leg path;

R101: is a signaling path between the SCC AS/S-CSCF and the UE-2 which communicate with each other through the SIP protocol of the IMS, and for the SCC AS, it is a remote leg path.

After the service continuity occurs, the signaling paths and media paths between the UE-1 and the UE-2 are changed, and the change in the signaling paths is described as follows:

A111: is a signaling path between the UE-1 and the eMSC which communicate with each other through the signaling protocol of the CS domain, and for the SCC AS, it belongs to an access leg path;

A112: is a signaling path between the eMSC and the SCC AS/S-CSCF which communicate with each other through the SIP protocol of the IMS, and for the SCC AS, it also belongs to an access leg path;

R101: is a signaling path between the SCC AS/S-CSCF and the UE-2 which communicate with each other through the SIP protocol of the IMS, and for the SCC AS, it is a remote leg path, and after the service continuity occurs, this remote leg path is not changed.

FIG. 2 is an implementation flow chart of the existing voice service continuity, which describes that the UE-1 directly establishes a voice session with the UE-2 in the IMS domain through the PS access network, and after the UE-1 transfers from the PS domain to the CS domain, the particular description of a process of how the UE-1 and the network implement call service continuity is as follows.

In step 201, the UE-1 initiates a CS call to the eMSC in the CS domain, for example, sends a "SETUP" (call setup) message carrying a session transfer number (STN).

The STN is a transfer number statically configured on the UE, for routing the call setup request in the CS domain to the SCC AS and identifying this session setup request as a session transfer request.

In step 202, the eMSC converts the CS domain call request into an IMS session setup request carrying the media information of the eMSC, and sends to the SCC AS through the CSCF; since all the sessions are anchored at the SCC AS, the SCC AS, according to the information in the session setup request, such as STN, identifies that this session setup request message is the session transfer request initiated by the UE-1, and associates the session which is needed to be transferred and is already established on the source access network by the UE-1.

In step 203, the SCC AS initiates remote leg update, e.g., through a "re-INVITE" message, to update the media information with the remote end UE-2.

In step 204, after the step 203 is finished, the SCC AS replies the session setup message, for example, sends a "200 OK" message carrying the updated media information, and this message reaches the eMSC through the CSCF.

In step 205, the eMSC replies a CS call setup response, such as a "Connect" message, to the UE-1, so as to complete the setup of the access path in the target CS domain.

In step 206, the SCC AS releases the access leg on the source access network.

The above existing method for implementing the session service continuity has the following problem: when the session already set up on the source access network is held by the UE-1 or the UE-2, the eMSC of the target network cannot learn that the session is held, therefore, in step 202, the state information in the media information carried in the eMSC is the default active state; The SCC AS will use the wrong media state to set up a new access path according to the instruction of step 202, and the SCC AS will use the wrong media state information to update the remote leg in step 203. As described above, after the SC transfer flow is completed, it will cause that the held state voice session of the user is connected incorrectly, which leads to incorrect user experience and even affects user privacy.

CONTENT OF THE INVENTION

The technical problem to be solved by the present invention is to provide a method and system for realizing voice call transfer, so as to ensure the correct transfer of the held state voice session.

In order to solve the above technical problem, the present invention provides a method for realizing session transfer, comprising: a service continuity application server (SCC AS), after receiving a session transfer request, when judging that a state of a session needed to be transferred is a held state, updating a remote leg by using a held state session state information, and notifying an enhanced mobile switching center (eMSC) that the state of the session needed to be transferred is the held state; and the eMSC completing a call setup of a target access network according to the held state.

The above method can further have the following feature: the step of the SCC AS notifying the eMSC that the state of the session needed to be transferred is the held state comprises:

when the SCC AS judges that the state of the session needed to be transferred is the held state, rejecting the session transfer request, replying a rejection message carrying the held state session state information to the eMSC, and notifying the eMSC that the state of the session needed to be transferred is the held state;

or, when the SCC AS judges that the state of the session needed to be transferred is the held state, and before replying a rejection message to the eMSC, notifying the eMSC that the state of the session needed to be transferred is the held state by carrying the held state session state information in a temporary response message or a notification message.

The above method can further have the following feature: the method further comprises:

after receiving the held state session state information, the eMSC resending a session setup request to the SCC AS, wherein the session setup request carries the held state session state information;

performing the step of the SCC AS updating the remote leg by using the held state session state information after the SCC AS receives the session setup request.

The above method can further have the following feature: the step of the SCC AS notifying the eMSC that the state of the session needed to be transferred is the held state comprises:

after the SCC AS updates the remote leg, replying an acknowledgement message carrying the held state session state information to the eMSC, and notifying the eMSC that the state of the session needed to be transferred is the held state.

The above method can further have the following feature: if a local terminal holds the remote leg of the session needed to be transferred in a source access network, after the session is transferred to a circuit switch (CS) domain, the eMSC does not send media to the remote leg.

The present invention also provides a system for realizing session transfer, comprising: an SCC AS and an eMSC, wherein, the SCC AS is configured to: after receiving a transfer request, when judging that a state of a session needed to be transferred is a held state, update a remote leg by using a held state session state information, and notify the eMSC that the state of the session needed to be transferred is the held state; and the eMSC is configured to: when acquiring that the state of the session needed to be transferred is the held state, complete a call setup of a target access network according to the held state.

The above system can further have the following feature: the SCC AS is configured to notify the eMSC that the state of the session needed to be transferred is the held state by the following method: when judging that the state of the session needed to be transferred is the held state, rejecting the session transfer request, replying a rejection message carrying the held state session state information to the eMSC, and notifying the eMSC that the state of the session needed to be transferred is the held state; or when judging that the state of the session needed to be transferred is the held state, and before replying a rejection message to the eMSC, notifying the eMSC that the state of the session needed to be transferred is the held state by carrying the held state session state information in a temporary response message or a notification message.

The above system can further have the following feature: the eMSC is further configured to: after receiving the held state session state information, resend a session setup request to the SCC AS, wherein the session setup request carries the held state session state information; and the SCC AS is configured to: after receiving the session setup request, update the remote leg by using the held state session state information.

The above system can further have the following feature: the SCC AS is configured to notify the eMSC that the state of the session needed to be transferred is the held state by the following method: after updating the remote leg, replying a acknowledgement message carrying the held state session state information to the eMSC, and notifying the eMSC that the state of the session needed to be transferred is the held state.

The above system can further have the following feature: the eMSC is further configured to: if a local terminal holds the remote leg of the session needed to be transferred in a source access network, after the session is transferred to a circuit switch (CS) domain, not send media to the remote leg.

The present invention can realize correct transfer of a held state voice session, realize correct service logic and improve user experience.

PREFERRED EMBODIMENTS OF THE PRESENT INVENTION

In order to correctly realize held state voice call continuity, the present invention provides a method for session transfer of a held state voice call, in which an SCC AS checks a state of a session needed to be transferred, and notifies an eMSC, and the SCC AS and the eMSC interact to complete the correct transfer of the held state voice call, ensuring correct service logic and improving user experience.

Hereinafter, the method for optimizing the above held session transfer will be illustrated in detail by accompanying drawings and specific embodiments.

Figure 1:
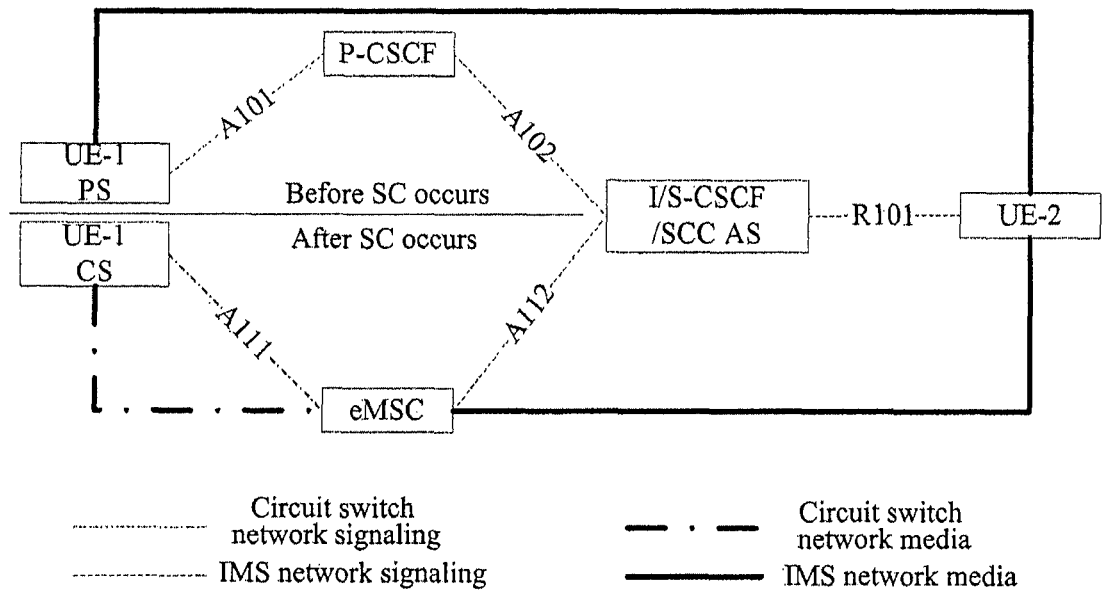
FIG. 1 is a schematic diagram of architecture of session transfer under dual wireless access mode.
Figure 2:
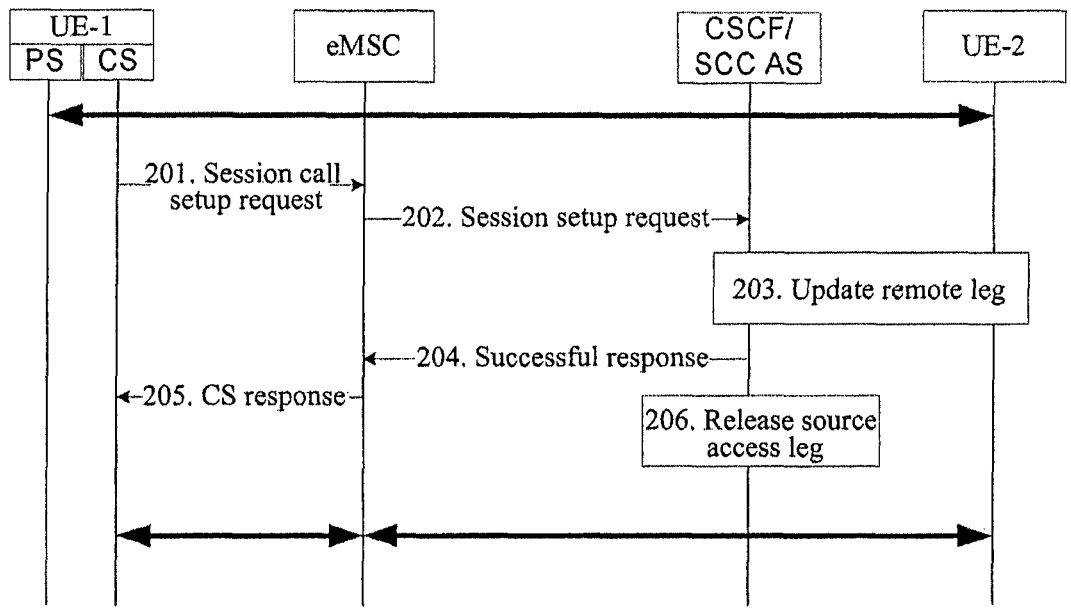
FIG. 2 is a schematic flowchart of session transfer in an active state in the related art.
Figure 3:
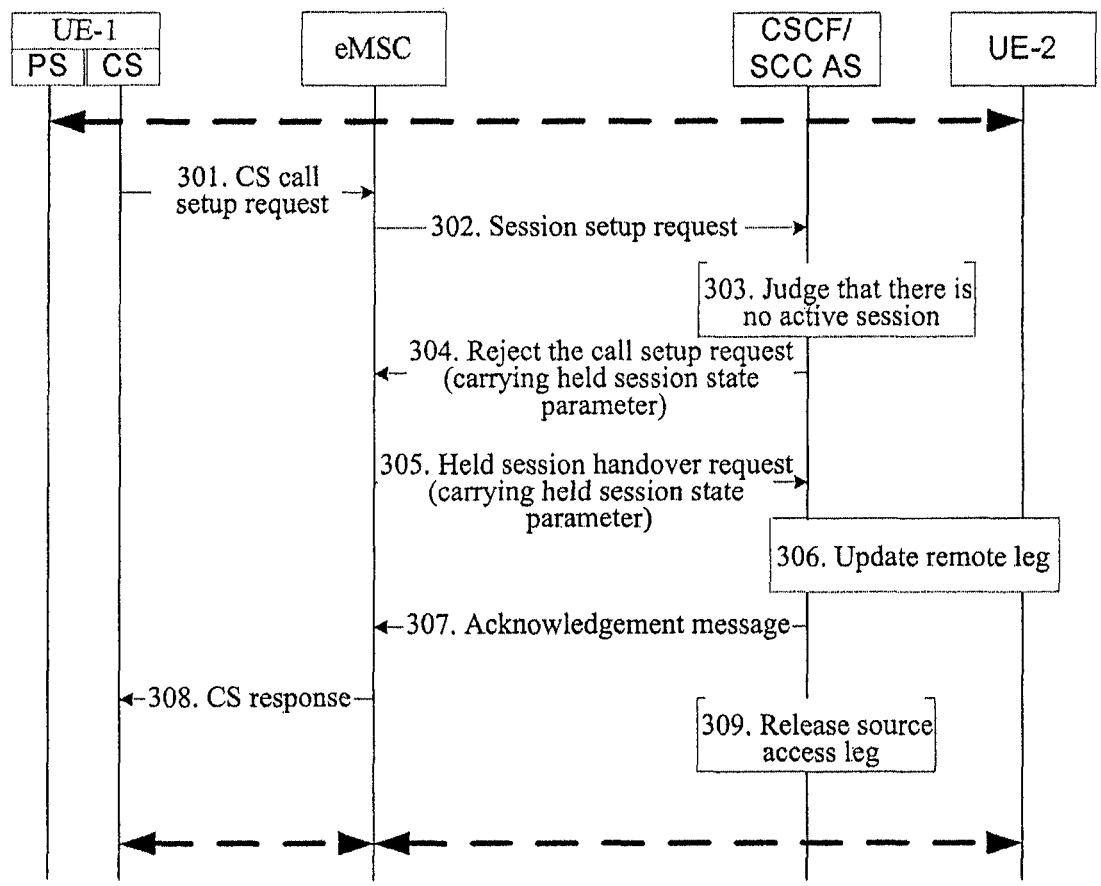
FIG. 3 is a schematic flowchart of signalings of held state voice session transfer according to embodiment one of the present invention.

FIG. 3 is a flow chart of held state session transfer according to embodiment one of the present invention. Its steps are described as follows.

In step 301, the UE-1 initiates a CS call to the eMSC in a CS domain, for example, sends a "SETUP" call setup message carrying an STN.

In step 302, the eMSC converts the CS domain call request into an IMS session setup request, such as an "INVITE message", carrying the media information about the eMSC, and sends to the SCC AS through the CSCF.

In step 303, the SCC AS receives the session setup request of step 302, and identifies that message as a session transfer request message according to the information carried therein, such as the STN. The SCC AS finds that the UE-1 does not have an active state session and only has a held state session by checking the locally stored user session state, i.e., the state of the session needed to be transferred is a held state.

In step 304, since the session state carried in the message in step 302 is a default active state, when the SCC AS judges that the state of the session needed to be transferred is the held state, it rejects the session setup request of step 302, replies a rejection message to the eMSC, and notifies the eMSC that the state of the session needed to be transferred is the held state in the rejection message;

or, before replying a rejection message to the eMSC, the SCC AS brings the held state session state information to the eMSC by a temporary response message such as "18X" message; or before replying a rejection message to the eMSC, the SCC AS brings the held state session state information to the eMSC by other notification messages, such as "INFO" or "REFER" message.

In step 305, after receiving the held state session state information, the eMSC re-initiates a session setup request to the SCC AS, for example, sends an "INVITE" message, carrying the correct session state information.

In step 306, after the SCC AS receives the session setup request of step 305, the SCC AS performs remote update towards UE-2.

In step 307, after the remote update is completed, the SCC AS replies an acknowledgement message, such as "200 OK", to the eMSC.

In step 308, the eMSC completes a call setup of a target access network according to the held state, which specifically includes that: the eMSC processes the media according to the held call, and replies a CS call setup response to the UE-1, such as a "Connect" message, so as to complete the setup of the signaling path of an access leg in the target CS domain;

if this held state session on the source access network is that UE-1 holds the remote leg UE-2, then, when the session is transferred to the CS domain, the eMSC needs to ensure not to deliver the media to the remote UE-2. Alternatively, the UE-1 does not send the media to the eMSC, thereby ensuring that after a session is set up on a new access domain, the remote UE-2 will not incorrectly receive the media stream sent by the UE-1.

In step 309, the SCC AS releases the access leg on the source access network.

Figure 4:
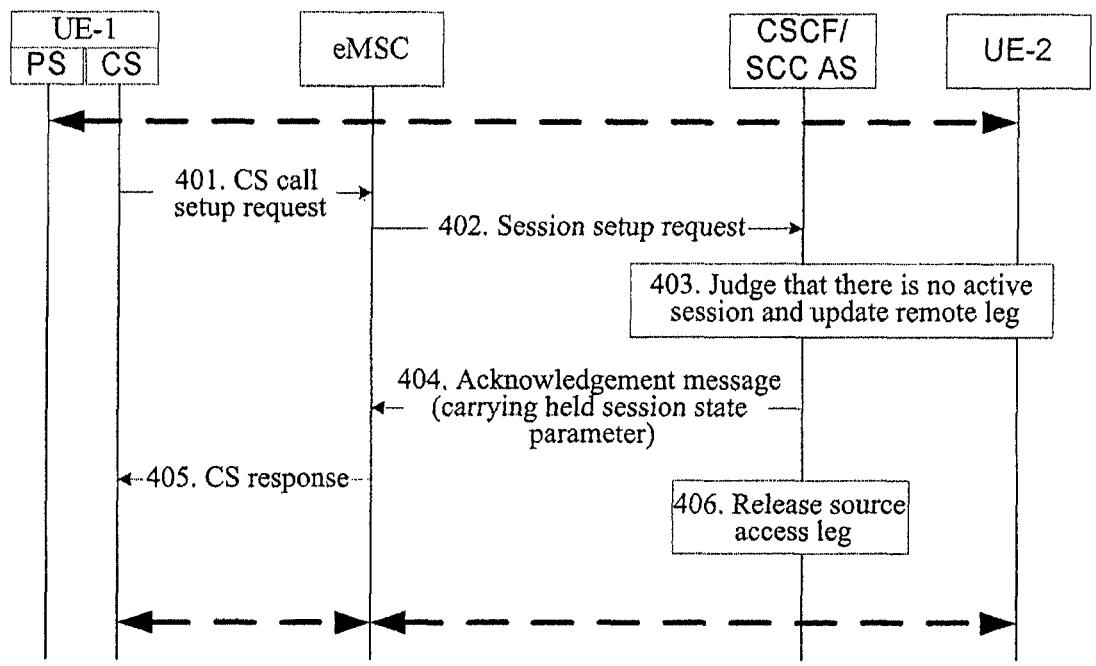
FIG. 4 is a schematic flowchart of signalings of held state voice session transfer according to embodiment two of the present invention.

FIG. 4 is a flow chart of held state session transfer according to embodiment two of the present invention. Its steps are described as follows.

In step 401, the UE-1 initiates a CS call to the eMSC in the CS domain, for example, sends a "SETUP" call setup message, carrying an STN.

In step 402, the eMSC converts the CS domain call request into an IMS session setup request, such as an "INVITE" message, carrying the media information about the eMSC, and sends to the SCC AS through the CSCF.

In step 403, the SCC AS receives the session setup request of step 402, and identifies that message as a session transfer request message according to the information carried therein, such as the STN. The SCC AS checks and finds that the UE-1 does not have an active state session on the source access network and only has a held state session, i.e., the state of the session needed to be transferred is the held state, thus the remote leg is updated by using the correct session state information (held state).

In step 404, after the remote leg is updated successfully, the SCC AS replies an acknowledgement message to the eMSC, such as "200 OK", in which the acknowledgement message carries the correct session state information, i.e., the held state session state information is carried in the acknowledgement message, and the SCC AS notifies the eMSC that the state of the session needed to be transferred is the held state.

In step 405, the eMSC completes a call setup of a target access network according to the held state, which specifically includes that: the eMSC processes the media according to the held call, and replies a CS call setup response to the UE-1, such as a "Connect" message, so as to complete the setup of an access path of the CS domain;

if that held state session on the source access network is that the UE-1 holds the remote UE-2, then, after the session is transferred to the CS domain, the eMSC needs to ensure not to deliver the media to the remote UE-2; or, the UE-1 does not send the media to the eMSC, thereby ensuring that after a session is set up on the new access domain, the remote UE-2 will not incorrectly receive the media stream sent by the UE-1.

In step 406, the SCC AS releases the access leg on the source access domain.

The present invention also provides a system for realizing session transfer, comprising: an SCC AS and an eMSC, wherein, the SCC AS is configured to: after receiving a transfer request, when judging that a state of a session needed to be transferred is a held state, update a remote leg by using a held state session state information, and notify the eMSC that the state of the session needed to be transferred is the held state; and the eMSC is configured to: when acquiring that the state of the session needed to be transferred is the held state, complete a call setup of a target access network according to the held state.

Preferably, the SCC AS notifies the eMSC that the state of the session needed to be transferred is the held state by the following method: when judging that the state of the session needed to be transferred is the held state, rejecting the session transfer request, replying a rejection message carrying the held state session state information to the eMSC, and notifying the eMSC that the state of the session needed to be transferred is the held state; or when judging that the state of the session needed to be transferred is the held state, and before replying a rejection message to the eMSC, notifying the eMSC that the state of the session needed to be transferred is the held state by carrying the held state session state information in a temporary response message or a notification message.

Preferably, the eMSC is further configured to: after receiving the held state session state information, resend a session setup request to the SCC AS, wherein the session setup request carries the held state session state information; and the SCC AS is configured to: after receiving the session setup request, update the remote leg by using the held state session state information.

Preferably, the SCC AS notifies the eMSC that the state of the session needed to be transferred is the held state by the following method: after updating the remote leg, replying a acknowledgement message carrying the held state session state information to the eMSC, and notifying the eMSC that the state of the session needed to be transferred is the held state.

Preferably, the eMSC is further configured to: if a local terminal holds the remote leg of the session needed to be transferred in a source access network, after the session is transferred to a circuit switch (CS) domain, not send media to the remote leg.

Although the preferred embodiments of the present invention are disclosed for the purpose of giving typical examples, it will be understood by those skilled in the art that various modifications, add and replacements are also possible, therefore, the scope of the present invention should be not limited to the above embodiments.

Those skilled in the art can understand that all of or part of the steps in the above methods can be completed by instructing relevant hardware by programs, and the programs can be stored in a computer readable storage medium, such as read only memory, magnetic disk, or optical disk, etc. Optionally, all of or part of the steps of the above embodiments can also be implemented by using one or more integrated circuits. Accordingly, each module/unit in the above embodiments can be implemented by adopting the form of hardware or software function module. The present invention is not limited to any particular form of combination of hardware and software.

INDUSTRIAL APPLICABILITY

The present invention can realize correct transfer of a held state voice call session, realize correct service logic and improve user experience.

What we claim is:

1. A method for realizing session transfer, comprising:
a service continuity application server (SCC AS), after receiving a session transfer request, when judging that a state of a session needed to be transferred is a held state, updating a remote leg by using a held state session state information, and notifying an enhanced mobile switching center (eMSC) that the state of the session needed to be transferred is the held state; and
the eMSC completing a call setup of a target access network according to the held state,
wherein, the step of the SCC AS notifying the eMSC that the state of the session needed to be transferred is the held state comprises:
when the SCC AS judges that the state of the session needed to be transferred is the held state, rejecting the session transfer request, replying a rejection message carrying the held state session state information to the eMSC, and notifying the eMSC that the state of the session needed to be transferred is the held state;
or, when the SCC AS judges that the state of the session needed to be transferred is the held state, and before replying a rejection message to the eMSC, notifying the eMSC that the state of the session needed to be transferred is the held state by carrying the held state session state information in a temporary response message or a notification message;
after the SCC AS updates the remote leg, replying an acknowledgement message carrying the held state session state information to the eMSC, and notifying the eMSC that the state of the session needed to be transferred is the held state.

2. The method as claimed in claim 1, further comprising:
after receiving the held state session state information, the eMSC resending a session setup request to the SCC AS, wherein the session setup request carries the held state session state information;
performing the step of the SCC AS updating the remote leg by using the held state session state information after the SCC AS receives the session setup request.

3. A system for realizing session transfer, comprising: a service continuity application server (SCC AS) and an enhanced mobile switching center (eMSC), wherein,
the SCC AS is configured to: after receiving a transfer request, when judging that a state of a session needed to be transferred is a held state, update a remote leg by using a held state session state information, and notify the eMSC that the state of the session needed to be transferred is the held state; and the eMSC is configured to: when acquiring that the state of the session needed to be transferred is the held state, complete a call setup of a target access network according to the held state, wherein, the SCC AS is configured to notify the eMSC that the state of the session needed to be transferred is the held state by the following method:

when judging that the state of the session needed to be transferred is the held state, rejecting the session transfer request, replying a rejection message carrying the held state session state information to the eMSC, and notifying the eMSC that the state of the session needed to be transferred is the held state; or when judging that the state of the session needed to be transferred is the held state, and before replying a rejection message to the eMSC, notifying the eMSC that the state of the session needed to be transferred is the held state by carrying the held state session state information in a temporary response message or a notification message;

after updating the remote leg, replying an acknowledgement message carrying the held state session state information to the eMSC, and notifying the eMSC that the state of the session needed to be transferred is the held state.

4. The system as claimed in claim 3, wherein, the eMSC is further configured to: after receiving the held state session state information, resend a session setup request to the SCC AS, wherein the session setup request carries the held state session state information; and the SCC AS is configured to: after receiving the session setup request, update the remote leg by using the held state session state information.

* * * * *